United States Patent
Boutros et al.

(10) Patent No.: US 9,548,959 B2
(45) Date of Patent: Jan. 17, 2017

(54) ADDRESS RESOLUTION SUPPRESSION FOR DATA CENTER INTERCONNECT

(75) Inventors: Sami Boutros, San Ramon, CA (US); Samer Salam, Vancouver (CA); Ali Sajassi, San Ramon, CA (US); Clarence Filsfils, Brussels (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 533 days.

(21) Appl. No.: 13/428,436

(22) Filed: Mar. 23, 2012

(65) Prior Publication Data
US 2013/0254359 A1    Sep. 26, 2013

(51) Int. Cl.
G06F 15/173 (2006.01)
H04L 29/12 (2006.01)

(52) U.S. Cl.
CPC ......... H04L 61/103 (2013.01); H04L 61/6009 (2013.01)

(58) Field of Classification Search
CPC ............. H04L 61/103; H04L 29/12028; H04L 61/6009
USPC .................................................. 709/220–229
See application file for complete search history.

(56) References Cited

U.S. PATENT DOCUMENTS

| | | | | |
|---|---|---|---|---|
| 2003/0037163 A1* | 2/2003 | Kitada | ................ | H04L 12/4645 709/236 |
| 2003/0055929 A1* | 3/2003 | Ding et al. | ..................... | 709/223 |
| 2005/0053079 A1* | 3/2005 | Havala | .......................... | 370/400 |
| 2005/0262235 A1* | 11/2005 | Childress | .............. | G06F 9/5033 709/224 |
| 2007/0201490 A1* | 8/2007 | Mahamuni | ............... | 370/395.54 |
| 2008/0250123 A1* | 10/2008 | Chae et al. | .................... | 709/220 |
| 2009/0235283 A1* | 9/2009 | Kim et al. | ..................... | 719/328 |
| 2011/0083168 A1* | 4/2011 | Dutta et al. | ....................... | 726/4 |
| 2011/0200042 A1* | 8/2011 | Goli et al. | ..................... | 370/390 |
| 2011/0206047 A1* | 8/2011 | Donthamsetty et al. | ...... | 370/392 |
| 2012/0014386 A1* | 1/2012 | Xiong et al. | ................... | 370/392 |
| 2012/0304294 A1* | 11/2012 | Fujiwara | ......................... | 726/22 |

(Continued)

OTHER PUBLICATIONS

Perkins (Perkins, RFC 3344 IP Mobility Support for IPv4, Aug. 2002, Network Working Group Request for Comments 3344 Obsoletes 3220 Category Standards Track, Nokia Research Center, retrieved from http://www.ietf.org/rfc/rfc3344.txt, pp. 69-73).*

(Continued)

Primary Examiner — Tauqir Hussain
Assistant Examiner — Michael A Keller
(74) Attorney, Agent, or Firm — Patent Capital Group

(57) ABSTRACT

An example method is provided that includes determining whether an address resolution protocol reply from a local machine has been received at an edge node; updating a local cache based on the reply from the local machine; and sending the reply to a plurality of edge nodes through a data plane of a data center interconnect. In more specific implementations, the method can include determining whether an address resolution protocol request has been received from the local machine. The method could also include updating a local machine cache based on the request. In certain implementations, the method can include determining whether the request is targeting the local machine; and dropping the request if the request is targeting the local machine. The method could also include sending the request through the data center interconnect if the request is not targeting the local machine.

19 Claims, 5 Drawing Sheets

(56) References Cited

U.S. PATENT DOCUMENTS

2013/0039218 A1* 2/2013 Narasimhan et al. ........ 370/255
2013/0083782 A1* 4/2013 Murphy et al. ............... 370/338

OTHER PUBLICATIONS

Anwer (Anwer, Muhammad, Building a Fast, Virtualized Data Plane with Programmable Hardware, 2009, School of Computer Science, Georgia Tech, p. 3 section 4 Ln 14; regarding defining data plane as infrastructure responsible for forwarding packets).*
Nabil Bitar, et al., "Cloud Networking: Framework and VPN Applicability," Nov. 2011, IETF-82, Taipei, Taiwan, 20 pages; http://www6.ietf.org/proceedings/82/slides/l2vpn-8.pdf.

* cited by examiner

ADDRESS RESOLUTION SUPPRESSION FOR DATA CENTER INTERCONNECT

TECHNICAL FIELD

The present disclosure relates generally to data centers and, more specifically, to address resolution suppression for a data center interconnect associated with a network.

BACKGROUND

When a computer needs to communicate directly with another computer (i.e., the target computer) over a network, the originating computer typically needs to know an address of the target computer. For local area networks (e.g., IEEE 802.3), a standard technique for acquiring an appropriate address of a target computer is for the originating computer to send a broadcast message with some identifying characteristic of the target computer to the other computers in the network. The target computer can then reply with its address while any other computer can ignore the request. Address Resolution Protocol (ARP) is a standard for performing such an address resolution. Unfortunately, in networks with large numbers of computers, for example those interconnecting data centers that have a large number of computers, broadcasts for addresses may consume both significant bandwidth and processing resources.

DETAILED DESCRIPTION OF EXAMPLE EMBODIMENTS

Overview

An example method is provided that includes determining whether an address resolution protocol reply from a local machine has been received at an edge node; updating a local cache based on the reply from the local machine; and sending the reply to a plurality of edge nodes through a data plane of a data center interconnect. In more specific implementations, the method can include determining whether an address resolution protocol request has been received from the local machine. The method could also include updating a local machine cache based on the request. In certain implementations, the method can include determining whether the request is targeting the local machine; and dropping the request if the request is targeting the local machine. The method could also include sending the request through the data center interconnect if the request is not targeting the local machine.

Alternative embodiments of the present disclosure may offer methods that determine whether an address binding for a particular machine that the request is targeting exists in a local cache; and send the address binding to the particular machine using an address resolution protocol reply message. Alternative methodologies can also include sending the request through the data center interconnect if the address binding for the target machine does not exist in the local cache. In addition, example methods can include determining whether an address resolution protocol request has been received from a remote machine in a data plane; and sending the request to at least one local machine.

Example Embodiments

Figure 1:
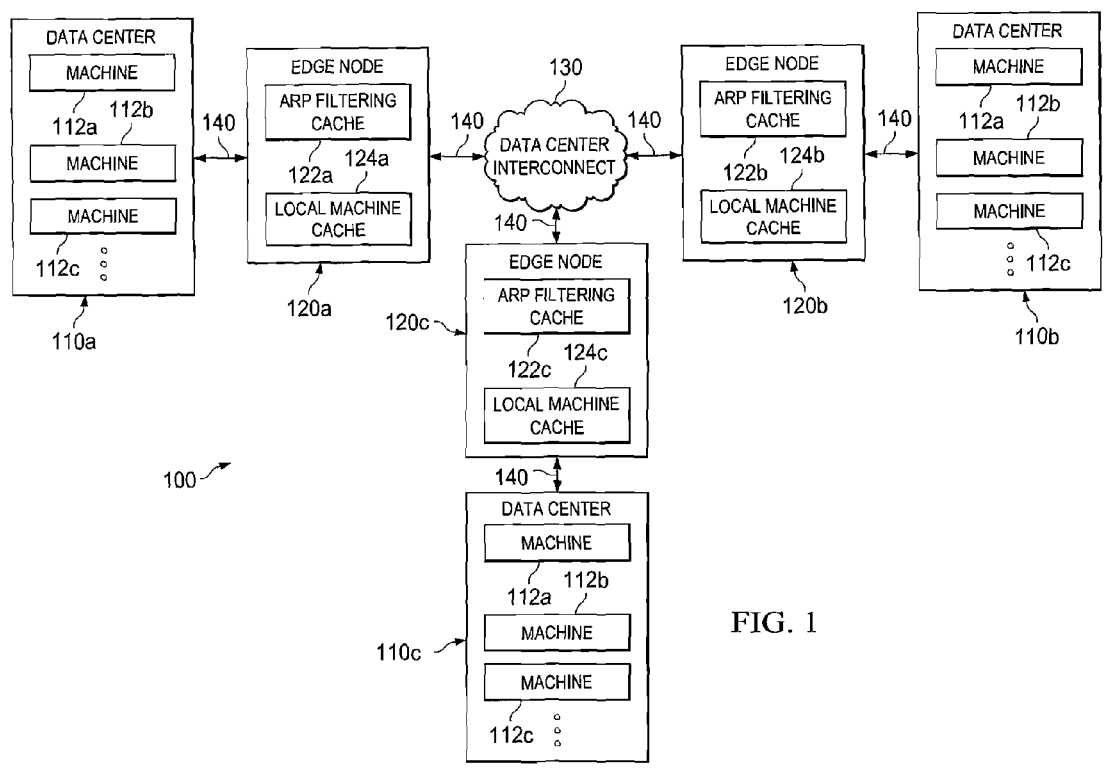
FIG. 1 is a block diagram illustrating an example system for address resolution suppression for a data center interconnect in accordance with one embodiment of the present disclosure.

FIG. 1 illustrates an example system 100 for address resolution suppression over a data center interconnect in accordance with one embodiment of the present disclosure. System 100 may include a number of data centers 110 (labeled 110a-c), a number of edge nodes 120 (labeled 120a-c), and a data center interconnect 130. Data centers 110 generally house a number of machines 112 (labeled 112a-c) that store and/or process data. Data center 110 may generally have any topology for machines 112. Machines 112 may, for example, be servers (e.g., Web servers, application servers, or database servers) or other computer systems. Machines 112 may be actual physical machines and/or virtual machines, which may be segmentations of one or more physical machines. The machines in a data center 110 may be coupled over a physical network (e.g., Ethernet) and/or a virtual network.

As discussed in more detail below, when machines 112 desire to communicate with each other they may need to determine link layer (i.e., Layer 2) addresses from network layer (i.e., Layer 3) addresses. Machines 112 may be able to determine the network layer addresses based on configuration, by relying on a Domain Name Service (DNS) to resolve machine names to machine addresses (e.g., Internet Protocol (IP) addresses), or any other appropriate technique. To accomplish this, the machines may use address resolution protocol (ARP) techniques.

ARP is a request and reply protocol that runs encapsulated by a line protocol. It is typically communicated within the boundaries of a single network. This property places ARP into the link layer of the Internet Protocol Suite, while in the Open Systems Interconnect (OSI) model, it is often described as residing between Layers 2 and 3, being encapsulated by Layer 2 protocols. ARP may be implemented in many combinations of network and overlaying internetwork technologies (e.g., IPv4, DECnet, and Xerox PARC Universal Packet (PUP)) using IEEE 802 standards, FDDI, Frame Relay, X.25, Asynchronous Transfer Mode (ATM). For purpose of illustration, this disclosure will use IPv4 over IEEE 802.3, which is one of the more common cases.

At a high level, ARP allows a machine to generate a message seeking the L2 address of another machine (i.e., an ARP request), and this message is broadcast to the other machines on the network. When the target machine receives the ARP request, as determined by Layer 3 (L3) address (e.g., an Internet Protocol (IP) address), the target machine may generate a message (i.e., an ARP reply) that informs the machine that originated the request as to the Layer 2 (L2)

address (e.g., a Media Address Control (MAC) address) of the target machine. This message is sent back to the originating machine in a unicast manner.

Edge nodes 120 provide communication connectivity between data centers 110 and data center interconnect 130. Edges nodes 120 may, for example, include one or more routers and/or switches that allow data centers 110 to communicate with data center interconnect 130. In particular implementations, any type of L2 switch may be used, regardless of its hardware capability. In the illustrated implementation, edge nodes 120 are portrayed as being between data centers 110 and data center interconnect 130. However, in other implementations, edge nodes 120 may be part of data centers 110 or data center interconnect 130. Edge nodes 120 may be part of the same virtual local area network (VLAN) or virtual private network (VPN), which may extend over data center interconnect 130. In certain implementations, edge nodes 120 may be provider edge devices, and in some implementations, edge nodes 120 may be data center/enterprise WAN edge devices.

Data center interconnect 130 provides communication between data centers 110. Data center interconnect may, for example, include a number of switches, routers, bridges, repeaters, and/or other equipment for conveying information. Data center interconnect 130 may, for example, be a wide area network (WAN) or the Internet. Data centers 110 are communicatively coupled to edge nodes 120 and edge nodes 120 are communicatively coupled to data center interconnect through links 140. Links 140 may include one or more wireline (e.g., cable or fiber optic) and/or wireless links (e.g., radio frequency).

Note that one approach for interconnected data centers relies on capturing address reply messages from remote target computers at an edge device for an interconnect and building a cache on the edge device in order to prevent further broadcast address requests when an address of a remote target computer is already known. Thus, when one computer that is local to a site connected to an edge device attempts to find a remote target computer, the edge device may also learn of the address of the remote target computer and provide the address to other local computers if they attempt to find the address. A cache may be built at each edge device to limit the number of broadcasts from each set of local computers. An extension of this solution uses control channels (e.g., via Border Gateway Protocol (BGP)) to communicate target computer addresses from edge devices of the sites hosting the target computers to all edge devices of all sites. This keeps the volume of address request broadcasts independent of the number of data centers being interconnected.

As the number of machines 112 in data centers 110 becomes large, the number of ARP messages may begin to affect the operations of system 100. For example, in data centers supporting millions of machines, the number of ARP requests may be quite large, which may affect the bandwidth in links 140. Moreover, a large number of ARP requests may slow down the processing of machines 112.

To combat these issues, each edge node 120 may include an ARP filtering cache 122 and a local machine cache 124 (labeled as 124a-c in FIG. 1). By using ARP packet inspection, each edge node 120 may adjust and store ARP filtering cache 122, which may include L3/L2 address bindings for remote machines (i.e., those that are located over the data center interconnect).

For example, assume that machine 112a in data center 110a needs to resolve the address of machine 112b in data center 110b. Machine 112a of data center 110a may generate and send an ARP request, which is broadcast to each of machines 112 in a data plane. When machine 112b of data center 110b receives the ARP request, the machine may generate and send an ARP reply. The other machines 112 may, after determining that the request it not destined for them, ignore the request.

As discussed in more detail below, the ARP reply is intercepted by edge node 120b, which then forwards (e.g., floods) the ARP reply in data plane to each of edge nodes 120. When edge nodes 120 receive the ARP reply, they may update their ARP filtering caches 122 with the L3/L2 address binding for machine 112b of data center 110b. The edge node 120 associated with the machine that initiated the ARP request (i.e., edge node 120a in this example) may also send the ARP reply to the initiating machine 112 in the associated data center 110 (i.e., machine 112a in data center 110a in this example) so that the initiating machine may carry out its functions.

Then, when another machine (e.g., machine 112b of data center 110a or machine 112a of data center 110c) attempts to resolve the address of machine 112b of data center 110b, the local edge node 120 may provide the L3/L2 address binding to the requesting machine without having to broadcast the ARP request over data center interconnect 130.

Thus, edge nodes 120 may be able to provide L3/L2 address bindings for one machine 112 to their local machines 112, while only having to broadcast an ARP request over data center interconnect 130 one time. That is, edge nodes 120 may serve as a pseudo ARP proxy for remote machines and reply to any subsequent ARP requests for these machines generated within the associated data center 110. Once a cache entry is built for a remote machine, ARP requests for that machine will not be forwarded into data center interconnect 130. Note that gratuitous ARP requests (i.e., those with the same source and destination L3 address) may not be filtered as they may be sent out by machines to advertise a change in their L3/L2 address mapping.

Additionally, each local machine cache 124 stores state identifiers (e.g., flags) for machines that are local to an associated edge node 120. Thus, when a local machine is attempting to resolve the address of another local machine 112 in the same data center 110, the associated edge node may again prevent the ARP request from being sent over data center interconnect 130, as there is no need for this to occur since the target machine is local.

For example, when machine 112a of data center 110a sends an ARP request for machine 112b of data center 110b, edge node 120a may determine that machine 112a is local and store an appropriate identifier (e.g., L3 or L2 address) in its cache 124. Additionally, when machine 112b of data center 110b responds with an ARP reply, edge node 120b may determine that machine 112b is local and store an appropriate identifier in its cache 124.

Then, if a machine in data center 110a attempts to resolve the address for machine 112a in data center 110a, edge node 120a may determine not to forward the ARP request to data center interconnect 130 since the requesting machine and the target machine are local to each other and should be able to communicate. Similarly, if a machine in data center 110b attempts to resolve the address for machine 112b in data center 110b, edge node 120b may determine not to forward the ARP request to data center interconnect 130 since the requesting machine and the target machine are local to each other and should be able to communicate.

By using ARP filtering cache 122 and local machine cache 124, unnecessary ARP broadcast traffic may be prevented from traversing data center interconnect 130. Moreover, the processing of unnecessary ARP requests at remote machines may be prevented. In certain implementations, edge nodes 120 may adjust (e.g., populate and/or update) ARP filtering cache 122 and local machine cache 124 by performing ARP message snooping in the data-plane. For example, when an edge node 120 receives an ARP reply from a local machine, the edge node may alter the delivery technique for the ARP reply from unicast to a multi-destination delivery technique (e.g., multicast or broadcast).

For multicast, the ARP reply may, for instance, be placed in a multicast tunnel. The ARP reply may then be sent (e.g., through ingress replication or a multicast tree) to the other edge nodes 120, which may also be snooping for ARP messages. Edge nodes 120 may, for example, be aware of each other through auto-discovery mechanisms. For instance, Border Gateway Protocol (BGP) based auto-discovery mechanisms used in VPLS and E-VPN could be used. A tunnel may also be used for broadcast delivery. For example, a broadcast may go to edge nodes 120 in service instance discovery.

Edge nodes 120 may filter the reply broadcasts/multicasts so as to prevent them from spreading to local machines 112. The edge node 120 that is associated with the data center 110 of the machine that initiated the ARP request may unicast the reply back to the initiating machine. ARP traffic may be forwarded in the context of its associated VLAN. Thus, ARP multicasts/broadcasts may be confined to edge nodes that are part of the same VLAN. Accordingly, not all edge nodes may be part of every VLAN. Gratuitous ARP requests received by an edge node from a local machine may be delivered to other edge nodes by these distributed delivery techniques as well.

When the other edge nodes 120 receive the ARP reply, they may adjust their ARP filtering cache 122 with the L3/L2 address binding for the target machine. Each edge node 120 may age out the ARP filtering cache entries independently. This may, for example, be performed by means of an aging timer, which may be one to several orders of magnitude larger than the ARP aging time on the machines. In certain implementations, a default timeout of approximately ten minutes may be used.

Edge nodes 120 may also adjust their ARP filtering caches 122 based on ARP requests. For example, when edge nodes 120 receive an ARP request over data center interconnect 300, they may determine whether an L3/L2 address binding for the requesting machine is stored in their local ARP filtering caches 122. If an L3/L2 address binding is not stored for the requesting machine, the receiving edge nodes 120 may store the L3/L2 address binding in caches 122.

The local machine cache may be built as each edge node 120 receives ARP messages from its local machines 112. For example, when an edge node 120 receives an ARP request from one of its local machines 112, the edge nodes may place a state identifier (e.g., a flag) for the local machine in the cache. In certain implementations, the edge node may parse the source IP/MAC and add or update an entry the local machine cache. The entry may, for example, contain the topology ID (Bridge-domain ID), sender IP address, sender MAC address, timestamp, and Layer 2 source MAC for unidirectional MAC support. An L3/L2 map may be unique per bridge domain. As another example, when an edge node receives an ARP reply from one of its local machines, it may place an identifier for the local machine in the cache.

If a machine in one of data centers 110 sends an ARP request for another machine 112 in the same data center and local machine cache 124 does not yet have a state identifier for the target machine, the associated edge node may have two different operations. If the target machine responds before the associated edge node receives the ARP request and the ARP reply is routed through the edge node, the edge node may refuse to send the ARP request into data center interconnect 130. On the other hand, if the ARP request reaches the associated edge node before the ARP reply or the ARP reply is not routed through the associated edge node, which is a special case of the former, the associated edge node may send the ARP request into the data center interconnect. The edge node may continue to send local ARP requests for the target machine until the target machine itself sends an ARP request or responds to an ARP reply received over the data center interconnect, which would allow the associated edge node to populate local machine 124 for it.

By distributing the ARP replies over the data center interconnect, a number of edge nodes 120 may learn the L3/L2 address binding of the target machine from the very first ARP request, and hence, future ARP broadcasts to the target machine from the data centers associated with those edge nodes may be reduced and/or eliminated, even though those data centers have never before sent an ARP request for the target machine. Thus, as opposed to having an ARP request be issued from every data center before each of edge nodes 120 may adjust their ARP filtering caches 122 for a particular machine, only one ARP request is required to achieve the population, which means that the volume of broadcasts is decoupled from the number of data center sites.

Additionally, because the technique is implemented in data plane, it does not require any control plane extensions (e.g., there are no Border Gateway Protocol (BGP) routes to be advertised) and is more efficient than using the control plane (e.g., there are no new messages to be created). Moreover, the technique is generally applicable to any virtual private network (VPN) while attempting to use control plane extensions for sending ARP replies is not (e.g., PPB-EVPN).

Thus, the technique can be readily scaled to millions of machines, which may be quite useful in virtual data center environments. Given this large scalability, minimizing ARP broadcasts and preventing broadcast storms that unnecessarily waste network bandwidth may be prevented. To facilitate system scalability, particular implementations may adjust the L3/L2 address bindings that are gleaned from ARP replies received over data center interconnect 130 in a software table. These implementations could then install them in the data-plane when there is an actual ARP request asking for the entry.

Once ARP filtering caches 122 and local machine caches 124 have begun to be built, edge nodes 120 may operate by performing a look up when ARP requests coming from a local machine are detected (e.g., by a snooping process) to determine whether the intercepting edge node has a cached entry in its ARP filtering cache 122. This may, for example, be performed by inspecting an L3 address associated with ARP request. If there is an entry in the ARP filtering cache, the edge node replies back to the requesting machine with the appropriate L3/L2 address binding and drops the ARP request. The L3/L2 address binding may have been learned from an ARP reply received over the data center interconnect.

If the edge node does not have an entry in its ARP filtering cache 122, the edge node examines its local machine cache 124 to determine whether the cache has an entry (e.g., an L3 address) for the target machine. If the local machine cache does have an entry for the target machine, the edge node may drop the ARP request. Thus, the edge node does not reply to the ARP request and does not send it to data center interconnect 130. This is because the local machine should respond to the ARP request on its own. If, however, the edge node finds no cached binding, then it will forward the ARP request, which is in broadcast mode, to the data center interconnect. The data center interconnect will distribute the ARP request to the other edge nodes 120, which will forward the request to their local machines. Note that the term 'determine' as used herein includes any activities associated with analyzing, evaluating, examining, sorting, matching, or otherwise processing a given electronic object.

Edge nodes 120 may also continue to adjust their ARP filtering caches 122 and local machine caches 124 by performing ARP message snooping in the data plane. Thus, when an ARP reply is received from a local machine, an edge node may adjust local machine cache 124. Additionally, the edge node may send the ARP reply to other edge nodes (e.g., through a multicast technique). Edge nodes 120 may also adjust local machine caches 124 as they receive ARP requests from their local machines. When edge nodes 120 receive an ARP reply from a remote machine, they may incrementally adjust their ARP filtering caches 122. Additionally, the edge node associated with the requesting machine may send the ARP reply to the requesting machine.

In certain implementations, a possible optimization involves an L2 address being removed from a Layer 2 Routing Information Base (L2RIB), and the ARP cache entries for that L2 address are deleted. This ensures that the ARP suppression feature does not respond on behalf of a non-existent machine. This could happen for example if a remote edge node stops advertising a MAC. The ARP entry deletion happens when an edge node is notified by the L2RIB that a unicast MAC entry has been removed.

System 100 is generally applicable to any Layer 2 data center interconnect technology. In particular, it is usable with a number of Virtual Private Network (VPN) technologies, such as, for example, Virtual Private LAN Service (VPLS), Advanced VPLS (A-VPLS), Active-Active VPLS (AA-VPLS), Ethernet Virtual Private Network (E-VPN), and Provider Backbone Bridging E-VPN (PBB-EVPN). The address resolution suppression scheme may be disabled on a per service instance basis. This may, for example, be accomplished based on configuration.

Although FIG. 1 illustrates one implementation of a system for address resolution suppression, other systems for address resolution suppression may have fewer, additional, and/or a different arrangement of components. For example, although system 100 is illustrated as having three data centers 120, other systems may have a larger number of data centers. In fact, the features of the address resolution suppression scheme become more pronounced for larger numbers of data centers. Additionally, although each data center is illustrated as having three or more machines, some data centers could have fewer machines (e.g., two or one). Furthermore, one or more ARP filtering cache 122 and local machine cache 124 sets could be in the same cache. For example, the L3/L2 address bindings and the state indicators could be part of the same array, table, or other appropriate construct. As another example, the implementation of the ARP caches and the logic that an edge node will use to learn ARP entries and to respond to ARP requests can be performed in software (e.g., on a CPU, a line card, or a route processor), in hardware (e.g., an ASIC, microcode, etc.), or a combination of software and hardware.

Figure 2:
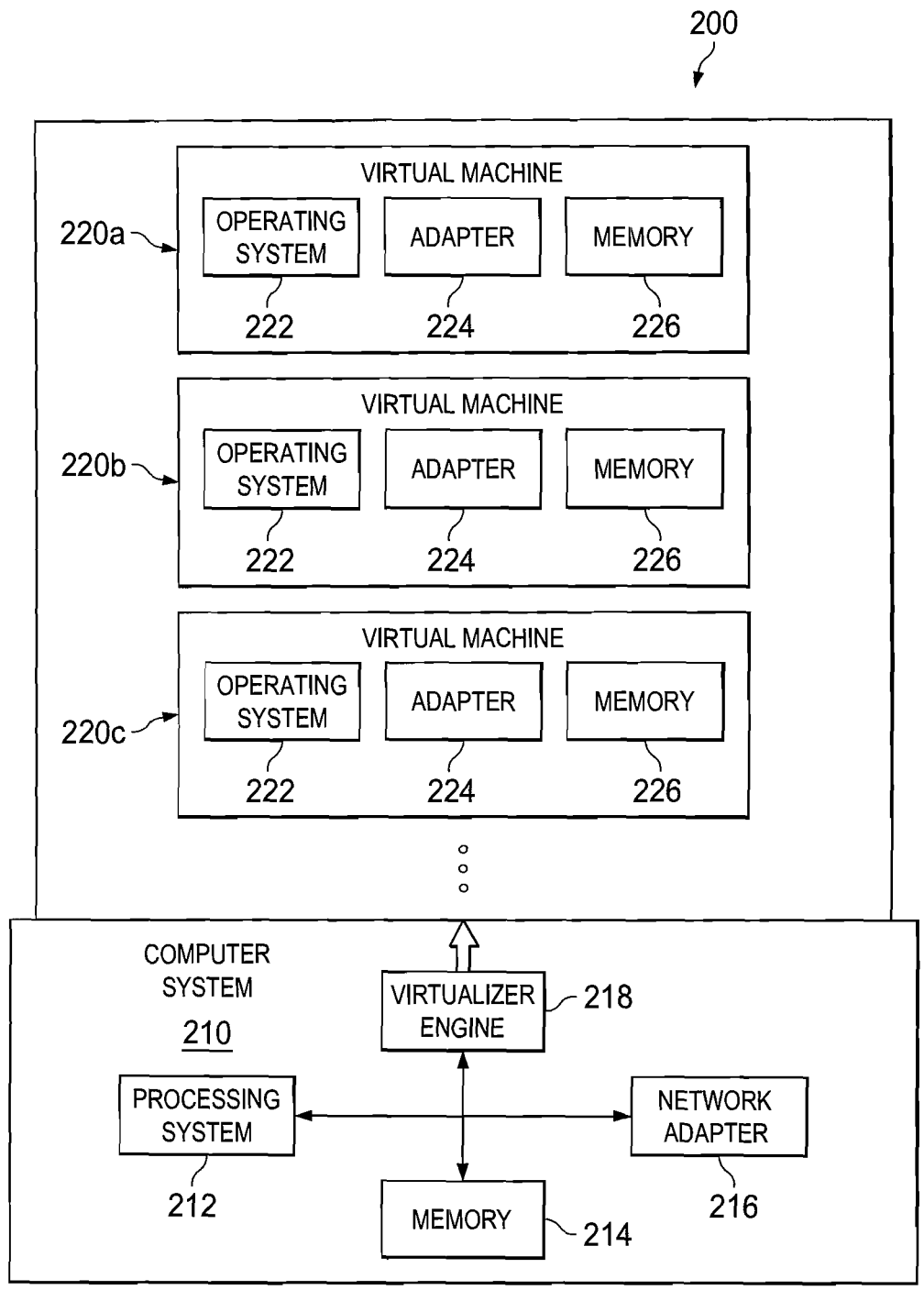
FIG. 2 is a block diagram illustrating an example virtual computer system for address resolution suppression for a data center interconnect in accordance with one embodiment of the present disclosure.

FIG. 2 illustrates an example virtualized computer system 200 for which ARP suppression may be implemented. System 200 may include a computer system 210 on which a number of virtual machines 220 (labeled 220a-c) are operating. Computer system 210 may include a processing system 212, memory 214, a network adapter 216, and a virtualizer engine 218. Computer system 210 may be composed of various hardware and software components, such as, for example, servers, processors, databases, and storage areas. Computer system 210 may, for instance, be a data center. Computer system 210 may appear as a single computer system to applications using and accessing it. Computer system 210 may, for instance, use virtualization to appear as an integrated computer system.

In particular implementations, computer system 210 may be a virtual input-output server (VIOS) from International Business Machines of Armonk, N.Y. A VIOS may provide an operating environment for virtual I/O administration. A VIOS may also facilitate the sharing of physical I/O resources between the virtual machines supported by computer system 210, such as virtual machines 220, by creating virtual devices.

Memory 214 may include, among other things, operating systems and applications for virtual machines 220. Memory 214 may also include a variety of other items for the virtual machines (e.g., queues, transmit engines, receive engines) as well as for the computer system (e.g., operating system and applications). Memory 214 may be composed of one or more storage devices (e.g., hard drives, tape drives, flash drives, etc.).

Network adapter 216 is a physical device that provides access to a communication network (e.g., a LAN, a WAN, or the Internet). Network adapter 216 acts as a single physical adapter and also creates virtual adapters, represented to virtual machines 220, which could, for example, be Logical Partitions (LPARs) from International Business Machines Corporation, as real physical adapters. Adapters able to perform this include those supporting the Single Root I/O Virtualization (SRIOV) extension to the PCI-E standard and the Multi-Root I/O Virtualization (MRIOV) extension. In general, any extension that allows I/O virtualization may be used.

Virtualizer engine 218 is responsible for providing an interface between virtual machines 220 and computer system 210, which is responsible for actually executing the operations of the virtual machines 220 and transferring data to and from memory 214. Virtualizer engine 218 may export various virtualized hardware components such as virtual CPU(s), virtual memory, virtual disks, and virtual devices as constructs or emulations to the virtual machines. Thus, virtualizer engine 218 may make the resources of computer system 210 appear as a single computer system when it is in fact a number of computer systems. In particular implementations, virtualizer engine 218 may be a thin piece of software that runs on a host (e.g., along with the host operating system) or through an intervening kernel, which performs the functions of the host operating system.

In some implementations, virtualizer engine 218 may include a VIOS, a hypervisor, and a hardware management console. A hypervisor, also known as a virtual machine manager, is a program that enables multiple operating systems to share a single hardware host. Each operating system may appear to have the host's processor, memory, and other system resources all to itself. However, the hypervisor may actually control the host processor and the system resources, allocating the necessary resources to each operating system.

Each virtual machine 220 is a segmentation of computer system 210, virtualized as a separate computer system. In a VIOS environment, for example, each virtual machine 220 is a logical partition of computer system 210. Virtual machines 220 can be quickly deployed by allowing the image of the executable code that composes the solution for which the virtual machine partition is created to be shared amongst all similar virtual machines. Each virtual machine 220 may, however, behave as an independent computer system. Virtual machines 220 may, for example, be servers (e.g., Web, application, or database) or other appropriate types of computer systems.

Each of virtual machines 220 may include a respective memory 226, and an operating system 222, which may be an image of an operating system in memory 214, memory 226, etc. Operating systems 222 may actually be different operating systems (e.g., Linux, Unix, and AIX) or different versions of the same operating system (e.g., 1.2, 1.4, and 2.1). The applications for each virtual machine 220 may also be different. Each virtual machine 220 also includes a respective adapter 224, which may be a virtual function of network adapter 216. Through network adapter 216 and adapter 224, virtual machines 220 can receive multicast messages, unicast messages, and broadcast messages. In certain modes of operation, virtual machines 220 may be adapted to generate ARP requests when they need to communicate with other machines (whether real or virtual). An ARP request may, for example, be sent through network adapter 216 to other virtual machines 220 in system 200 and/or to remote machines, through a data center interconnect.

If a machine 220 in system 200 receives an ARP request, the receiving machine may determine whether the ARP request is directed to it (e.g., based on an L3 address). If the ARP request is not directed to it, the receiving machine may ignore the ARP request. If, however, the ARP request is directed to the receiving virtual machine 220, the machine may generate an ARP reply, which may be sent back to the requesting machine through network adapter 216. By the ARP reply, the requesting machine may learn of the L3/L2 address binding of the target virtual machine 220.

Similarly, if a remote (e.g., in another data center) machine (whether real or virtual) receives the ARP request, the receiving machine may determine whether the ARP request is directed to it (e.g., based on an L3 address). If the ARP request is not directed to it, the receiving machine may ignore the ARP request. If, however, the ARP request is directed to the receiving machine, the machine may generate an ARP reply, which may be sent back to the requesting virtual machine 220 through the data center interconnect and network adapter 216. By the ARP reply, the requesting virtual machine 220 may learn of the L3/L2 address binding of the target machine.

Figure 3:
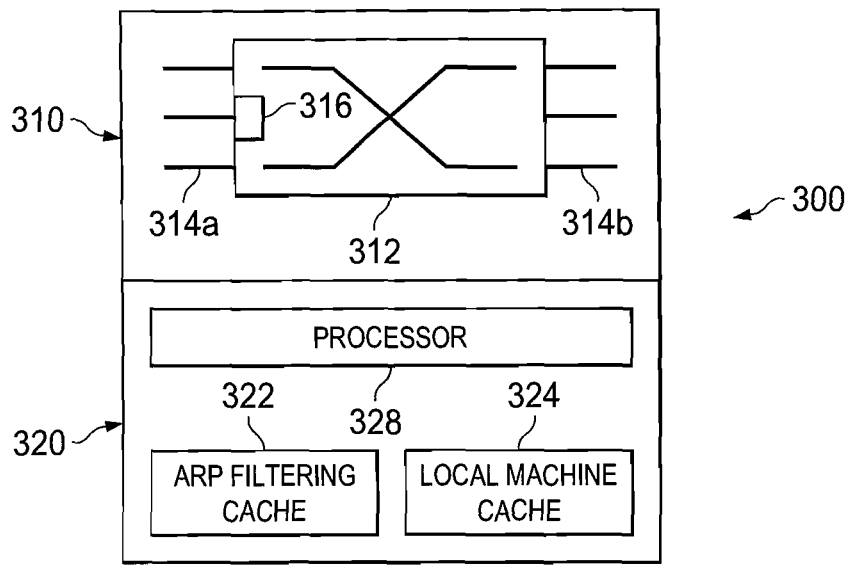
FIG. 3 is a block diagram illustrating an edge node for address resolution suppression for a data center interconnect in accordance with one embodiment of the present disclosure.

FIG. 3 illustrates an example edge node 300. In this example, edge node 300 is a switch. However, an edge node could be a router, a combination of switches and/or routers, or any other appropriate devices. Edge node 300 may include a data plane 310 and a control plane 320. In data plane 310, edge node 300 may include switching logic 312 connected between two sets of ports 314a and 314b. Switching logic 312 is configured to route or internally switch traffic received on one port set 314a (ingress ports) to another port set 314b (egress ports). Data plane 310 also include a processor 316 (e.g., an application specific integrated circuit (ASIC)) to perform enhanced operations. Control plane 320 may include a generic or application-specific processor 328 for implementing the switching functionality and any channel protocols. In particular implementations, processor 328 may be implemented in a state machine, a micro-controller, hardware, firmware, programmable logic, or a combination thereof.

Also included in edge node 300 is an ARP filtering cache 322 and a local machine cache 324. Edge node 300 may adjust ARP filtering cache 322 and local machine cache 324 by performing ARP message snooping in the data-plane. The snooping may be performed by switch logic 312 or processor 316. Although illustrated as separate caches, ARP filtering cache 322 and local machine cache 324 could be parts of the same cache.

Local machine cache 324 may, for example, be built as edge node 300 receives ARP messages from its local machines. For example, when edge node 300 receives an ARP reply from a local machine, the edge node may place an identifier (e.g., an L2 address) for the local machine in local machine cache 324. In certain implementations, the edge node may parse the source IP/MAC and add or update an entry in the local machine cache. The entry may, for example, contain the topology ID (Bridge-domain ID), sender IP address, sender MAC address, timestamp, and Layer 2 source MAC for unidirectional MAC support. Edge node 300 may also alter the delivery technique for the ARP reply (e.g., from unicast to multicast) so that it may be sent to a number of edge nodes. The snooping may be performed by switch logic 312 or processor 328. Thus, edge nodes other than the one associated with the machine generating the ARP request may learn of the L3/L2 address binding of the target machine. As another example, when edge node 300 receives an ARP request from one of its local machines, it may place an identifier for the local machine in the cache.

If edge node 300 receives an ARP reply over a data center interconnect, which may, for example, arrive as a multicast message and be detected by snooping, the edge node may incrementally adjust ARP filtering cache 322 with L3/L2 address bindings. This may occur whether the ARP reply is destined for a local machine or not. Thus, edge node 300 may learn of L3/L2 address bindings even for ARP requests that were not sent through it. If the ARP reply is destined for a local machine, edge node 300 may send the ARP reply to the local machine. If the ARP reply is not destined for a local machine, the edge node may drop the ARP reply.

To facilitate system scalability, in certain implementations, the L3/L2 address bindings that are gleaned from ARP replies received over a data center interconnect may first be built in cache 322, which could, for example, be in software. These implementations could then install them in the data plane when there is an actual ARP request seeking that entry. For example, special tables used for accelerating ARP processing could be used. These tables would typically be different from the switching tables. Processor 328 may be responsible for installing the entries into those tables. Thus, there could be hardware-based versions of 322 and 324 in the data plane.

Once ARP filtering cache 322 and local machine cache 324 have begun to be built, edge node 300 may operate by performing a look up in cache 322 when ARP requests coming from a local machine are intercepted (e.g., by a snooping process) to determine whether the edge node has a cached entry for the target machine. This may, for example, be performed by inspecting an L3 address associated with ARP request. If there is an entry for the target machine in ARP filtering cache 322, edge node 300 may reply back to the requesting machine with the L3/L2 address binding (e.g., in an ARP reply) and drop the ARP request.

If edge node 300 does not have an entry in the ARP filtering cache, the edge node may examine local machine cache 324 to determine whether the cache has an entry (e.g., an L3 address) for the target machine. If the local machine cache does have an entry for the target machine, the edge node may drop the ARP request. Thus, the edge node does not reply to the ARP request. This is because the target machine is local and should respond on its own. If, however, edge node 300 finds no cached entry for the target machine in cache 324, the edge node may forward the ARP request, which is in broadcast mode, to a data center interconnect. The data center interconnect will distribute the ARP request to other edge nodes, which will forward the request to their local machines.

Edge node 300 may also continue to adjust ARP filtering cache 322 and local machine cache 324 by performing ARP message snooping in the data plane. Thus, when an ARP reply is received from a local machine, edge node 300 may adjust local machine cache 324. Additionally, the edge node may send the ARP reply to other edge nodes (e.g., through a multicast technique). Edge node 300 may also adjust local machine cache 324 as ARP requests are received from local machines. When edge node 300 receives an ARP reply from a remote machine, the edge node may incrementally adjust its ARP filtering caches 322. Additionally, if edge node 300 is associated with the requesting machine, the edge node may send the ARP reply to the requesting machine. It should be noted that the terms 'reply' and 'request' as used herein refer to any suitable electronic messaging that may be propagating in the network (e.g., involving packets, frames, etc.).

Figure 4A:
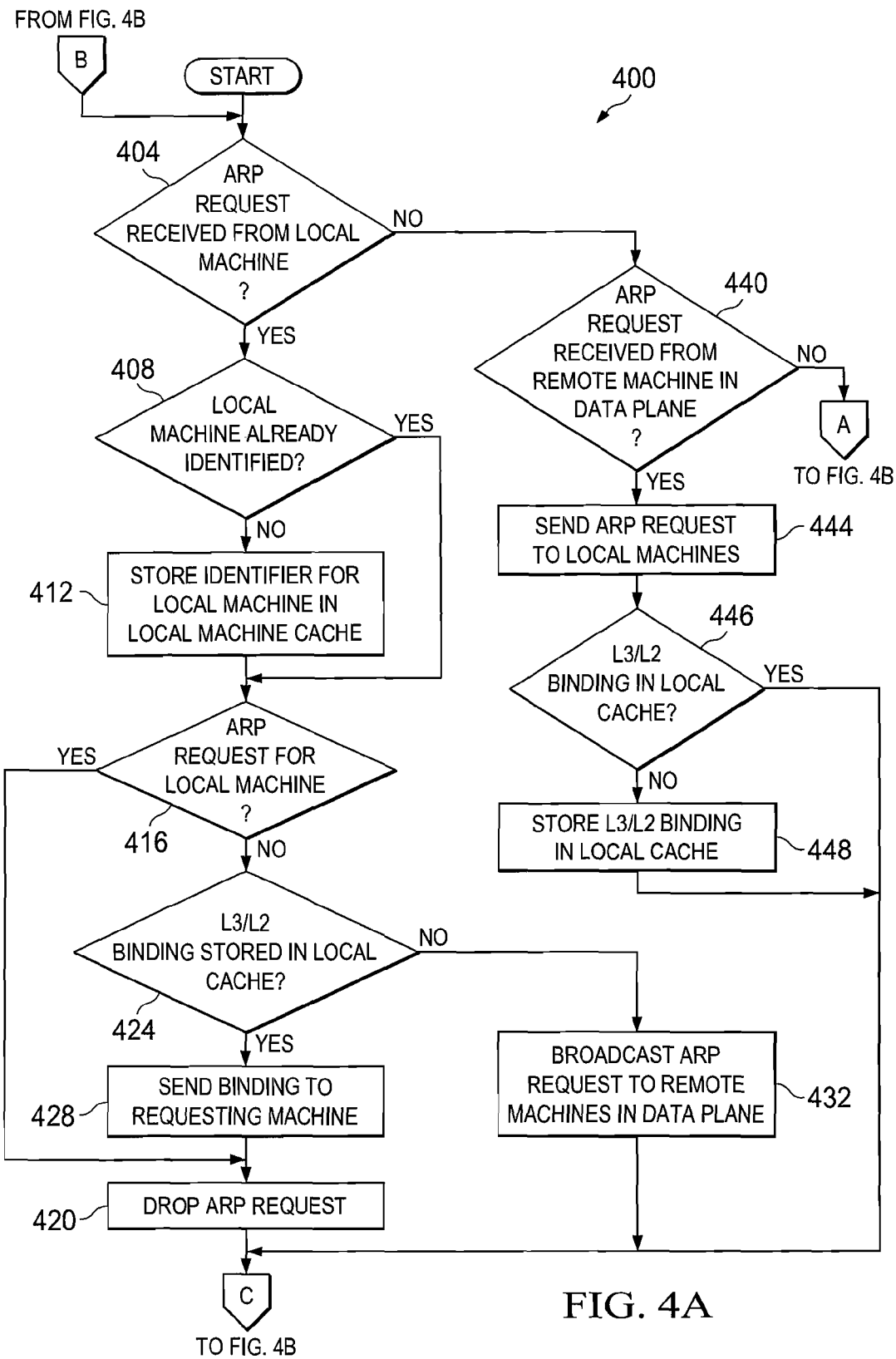
FIG. 4 is a block diagram illustrating an example process for address resolution suppression for a data center interconnect in accordance with one embodiment of the present disclosure.
Figure 4B:
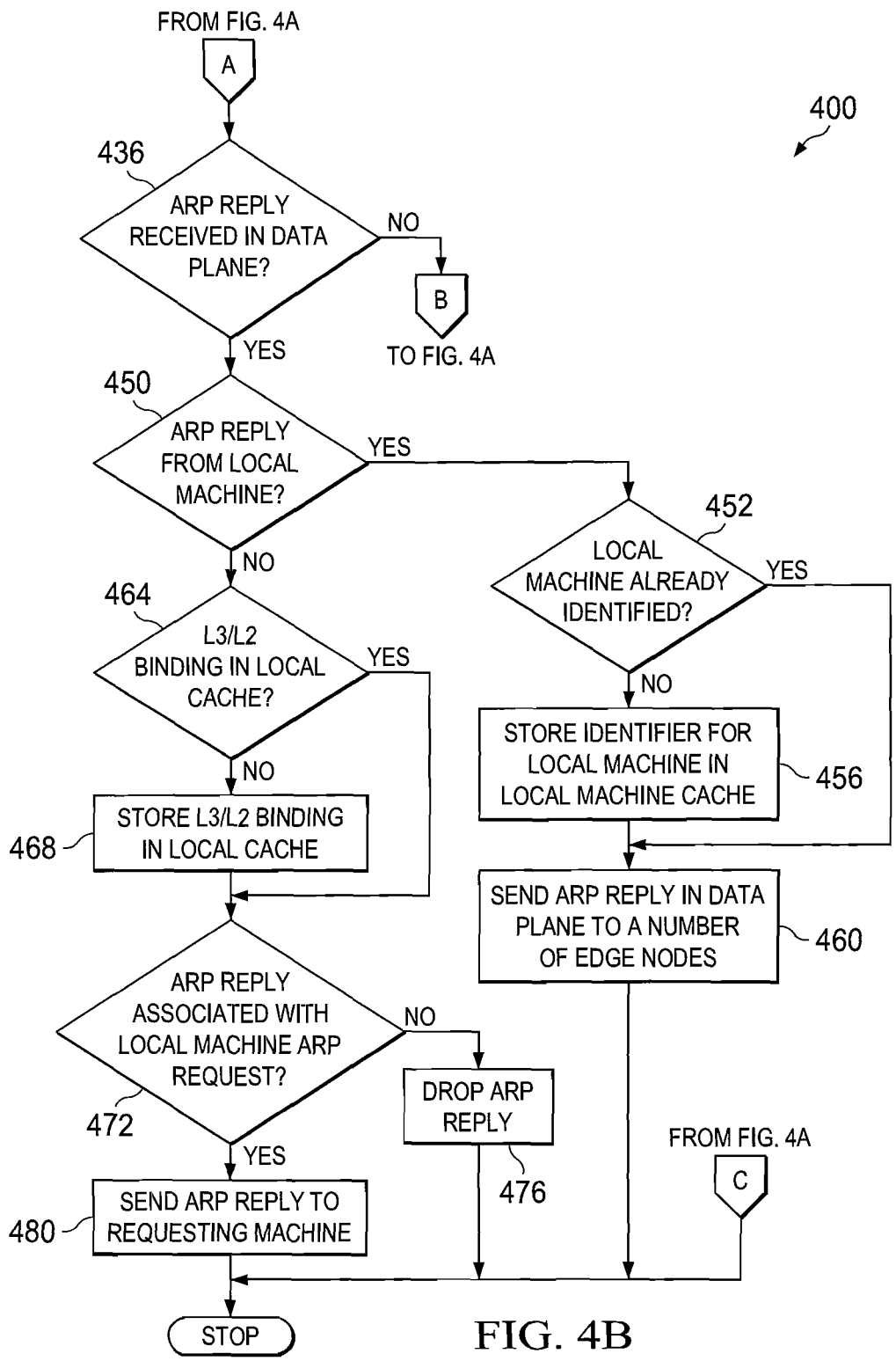

FIGS. 4A-B illustrate an example process 400 for address resolution suppression over a data center interconnect. Process 400 may, for example, be implemented by an edge node (e.g., a switch or router) that is located between a data center and a WAN. In some implementations, an edge node may be part of the data center, in certain implementations, an edge node may be part of the WAN, and in particular implementations, an edge node may be between the data center and the WAN.

Process 400 calls for determining whether an ARP request has been received from a local machine (operation 404). A local machine may, for example, be one that is not located over a data center interconnect. If an ARP request has been received from a local machine, process 400 calls for determining whether the local machine has already been identified (operation 408). Determining whether the local machine has already been identified may, for example, be accomplished by examining a cache for local machines. If the local machine has not been identified already, process 400 calls for storing an identifier for the local machine in a local machine cache (operation 412).

Once the identifier has been stored, or if the local machine has already been identified, process 400 calls for determining whether the ARP request is seeking address resolution for a local machine (operation 416). Determining whether the ARP request is seeking address resolution for a local machine may, for example, be accomplished by examining a cache of local machine identifiers (e.g., L3 and/or L2 addresses). If the ARP request is seeking address resolution for a local machine, process 400 calls for dropping the ARP request (operation 420). Process 400 is then at an end.

If, however, the ARP request is not seeking address resolution for a local machine, process 400 calls for determining whether an L3/L2 address binding for the machine for which the ARP request is destined is stored in a local cache (operation 424). If an L3/L2 address binding for the machine for which the ARP request is destined is stored in a local cache, process 400 calls for sending the binding to the requesting machine (operation 428). This binding should satisfy the ARP request. Process 400 also calls for dropping the ARP request (operation 420), and process 400 is again at an end. If, however, an L3/L2 address binding for the machine for which the ARP request is destined is not stored in a local cache, process 400 calls for broadcasting the ARP request to remote machines in a data plane (operation 432). The broadcast may, for example, be sent over a data center interconnect. Process 400 is then at an end.

If an ARP request has not been received from a local machine (operation 404), process 400 calls for determining whether an ARP request has been received from a remote machine in a data plane (operation 440). The remote machine may be attempting to determine an L2 address of a local machine. If an ARP request has been received from a remote machine in a data plane, process 400 calls for sending the ARP request to local machines (operation 444).

Process 400 also calls for determining whether an L3/L2 address binding for the requesting machine is stored in the local ARP filtering cache (operation 446). If an L3/L2 address binding is in the local cache, the local cache may be refreshed. Process 400 is then at an end. If an L3/L2 address binding is not stored for the requesting machine in the local cache, process 400 calls for storing the L3/L2 address binding in the local cache (operation 448). Process 400 is then at an end.

If an ARP request has not been received from a remote machine in a data plane, process 400 also calls for determining whether an ARP reply has been received in a data plane (operation 436). An ARP reply may, for example, be from a remote machine in response to an ARP request sent over a data center interconnect, an ARP reply from a local machine in response to a received ARP request, and/or an ARP reply from a remote machine in response to a received ARP request. Determining whether an ARP reply has been received may, for example, be accomplished by snooping for an ARP reply in a multicast tunnel. If an ARP reply has not been received, process 400 calls for again determining whether an ARP request has been received from a local machine (operation 404).

If, however, an ARP reply has been received in a data plane, process 400 calls for determining whether the ARP reply is from a local machine (operation 450). If the ARP reply is from a local machine, process 400 calls for determining whether the local machine has already been identified as a local machine (operation 452). Determining whether the local machine has already been identified as a local machine may, for example, be accomplished by examining a cache of local machine identifiers (e.g., L3 and/or L2 addresses). If the local machine has not been identified as a local machine, process 400 calls for storing an identifier (e.g., address) for the local machine in a local cache (operation 456).

Once the identifier has been stored, or if the local machine has already been identified as a local machine, process 400 calls for sending the ARP reply to a number of edge nodes in a data plane (operation 460). Sending the ARP reply to a number of edge nodes may, for example, be accomplished by sending the ARP reply in a multicast tunnel or a broadcast tunnel. Process 400 is then at an end. If, however, the ARP reply is not from a local machine, process 400 calls for determining whether an L3/L2 address binding for the machine generating the ARP reply is stored in a local ARP cache (operation 464). If an L3/L2 address binding for the machine generating the ARP reply is not stored in a local ARP cache, process 400 calls for storing the L3/L2 address binding in a local ARP cache (operation 468).

Once the L3/L2 address binding is stored in the local cache, or if the L3/L2 address binding was already stored in the local cache, process 400 calls for determining whether the ARP reply is associated with an ARP request from a local machine (operation 472). Determining whether the ARP reply is associated with an ARP request for local machine may, for example, be accomplished by examining the destination address for the ARP reply. If the reply is not associated with an ARP request from a local machine, process 400 calls for dropping the ARP reply (operation 476). Process 400 is then at an end. If, however, the ARP reply is associated with an ARP request from a local machine, process 400 calls for sending the ARP reply to the local machine (operation 480). Process 400 is then at an end.

Although FIG. 4 illustrates one example process for address resolution suppression over a data center interconnect, other process for address resolution suppression over a data center interconnect may include fewer, additional, and/or a different arrangement of operations. For example, determining whether an ARP request has been received from a local or remote machine and whether an ARP reply has been received may occur in any order. As another example, a process may not include adjusting and checking a local machine cache. As an additional example, if an ARP reply received over a data center interconnect is not associated with a local machine, the edge node may flood the reply to its local machines as opposed to dropping it. As a further example, a cache may be refreshed (e.g., with a binding) even if it already has data stored for a machine.

The flowcharts and block diagrams in the figures illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems that perform the specified function or acts, or combinations of special purpose hardware and computer instructions.

As will be appreciated, aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Program code embodied on a computer readable medium may be transmitted using any medium, including but not limited to wireless, wireline, optical fiber cable, RF, etc. or any suitable combination of the foregoing. Computer program code for carrying out operations for aspects of the disclosure may be written in any combination of one or more programming languages such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

Figure 5:
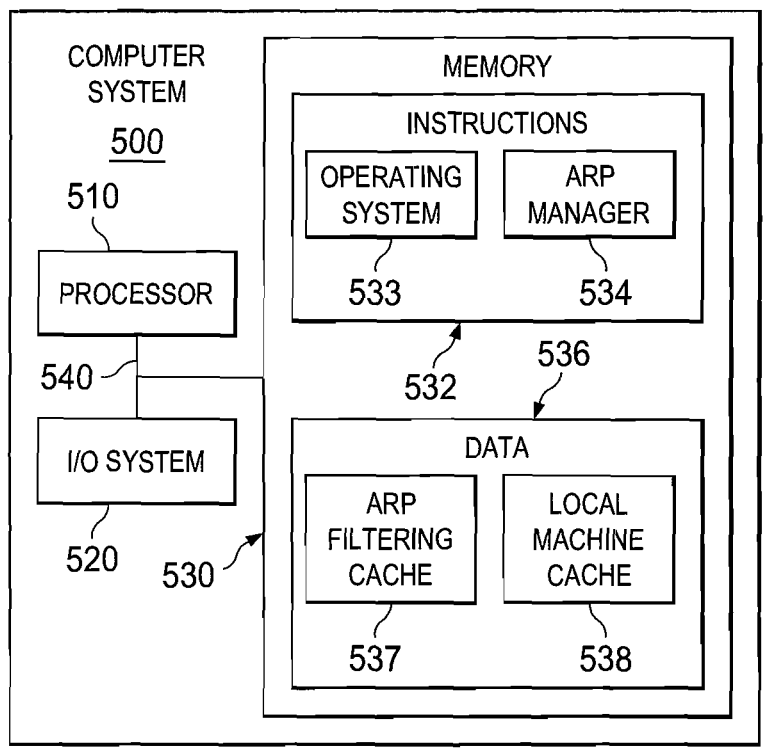
FIG. 5 is a block diagram illustrating an example computer system for address resolution suppression for a data center interconnect in accordance with one embodiment of the present disclosure.

FIG. 5 illustrates an example computer system 500 for managing address resolution suppression over a data center interconnect. Computer system 500 may include a processor 510, an input/output system 520, and a memory 530, which are coupled by a network 540. Computer system 500 may, for example, be functioning as a portion of an edge node. Processor 510 typically includes a logical processing unit (e.g., an arithmetic logic unit) that processes data under the direction of program instructions (e.g., from software). For example, processor 510 may be a microprocessor, a microcontroller, or an application specific integrated circuit. The processor may operate by reduced instruction set computer (RISC) or complex instruction set computer (CISC) principles. In general, the processor may be any device that manipulates data in a logical manner.

Input/output system 520 may include one or more communication interfaces and/or one or more user interfaces. A communication interface may, for instance, be a network interface card (whether wireless or wireless), a modem, or a bus interface. A user interface could, for instance, be a user input device (e.g., a keyboard, a keypad, a touchpad, a stylus, a mouse, or a microphone) or a user output device (e.g., a monitor, a display, or a speaker). In general, input/output system 520 may be any combination of devices by which a computer system can receive and output data.

Memory 530 may, for example, include random access memory (RAM), read-only memory (ROM), flash memory, and/or disc memory. Various items may be stored in different portions of the memory at various times. Memory 530, in general, may be any combination of devices for storing information. Memory 530 may include instructions 532 and data 536. Instructions 532 include an operating system 533 (e.g., Windows, Linux, or Unix) and applications 534, which include an ARP manager 534. Data 536 may include an ARP filtering cache 537 and a local machine cache 538. Network 540 may be responsible for communicating data between processor 510, input/output system 520, and memory 530. Network 540 may, for example, include a number of different types of busses (e.g., serial and parallel), or any other suitable link or communication pathway for the propagation of electronic signals.

In certain modes of operation, processor 510 may, according to ARP manager 534, adjust ARP filtering cache 537 and local machine cache 538 as the associated edge node receives message from local machines and remote machines. For example, when an ARP reply from a local machine is received by the edge node, processor 510 may place an identifier (e.g., an L2 address) for the local machine in local machine cache 538. In certain implementations, for example, the edge node may parse a source IP/MAC and adjust (e.g., add or update) an entry in the local machine cache. Processor 510 may also alter the delivery technique for the ARP reply (e.g., from unicast to multicast) so that it may be sent to a number of edge nodes. Thus, edge nodes other than the one associated with the machine generating the ARP request may learn of the L3/L2 address binding of the target machine. As another example, when the edge node receives an ARP request from one of its local machines, processor 510 may place an identifier for the local machine in cache 538.

If the edge node receives an ARP reply over a data center interconnect, which may, for example, arrive as a multicast message and be detected by snooping, processor 510 may incrementally adjust ARP filtering cache 537 by placing an L3/L2 address binding for the target machine in the cache. This may occur whether the ARP reply is destined for a local machine or not. Thus, processor 510 may adjust cache 537 even for ARP requests that were not sent through the edge node. If the ARP reply is destined for a local machine, processor 510 may forward the ARP reply to the local machine.

Once ARP filtering cache 537 and local machine cache 538 have begun to be adjust, processor 510 may operate by performing a look up when ARP requests coming from a local machine are intercepted (e.g., by a snooping process) to determine whether the edge node has a cached entry for the target machine. This may, for example, be performed by inspecting an L3 address associated with ARP request. If there is an entry in ARP filtering cache 537, processor 510 may reply back to the requesting machine with the L3/L2 address binding for the target machine, and the ARP request may be dropped.

If computer system 500 does not have an entry for the target machine in ARP filtering cache 537, processor 510 may examine local machine cache 538 to determine whether the cache has an entry (e.g., an L3 address) for the target machine. If the local machine cache does have an entry for the target machine, the ARP request may be dropped. Thus, the edge node does not reply to the ARP request. This is because the target machine is local and should respond on its own. If, however, there is no cached binding, processor 510 may forward the ARP request, which is in broadcast mode, to a data center interconnect. The data center interconnect will distribute the ARP request to other edge nodes, which will forward the request to their local machines.

Processor 510 may also continue to adjust ARP filtering cache 537 and local machine cache 538 based on ARP message snooping in the data plane. The snooping may be performed by the switch fabric or the processor itself. Thus, when an ARP reply is received from a local machine, processor 510 may adjust local machine cache 538. Additionally, processor 510 may send the ARP reply to other edge nodes (e.g., through a multicast technique). Processor 510 may also adjust local machine cache 538 as ARP requests are received from local machines.

When computer system 500 receives an ARP reply from a remote machine, processor 510 may incrementally adjust ARP filtering caches 538. Additionally, if the edge node is associated with the requesting machine, processor 510 may send the ARP reply to the requesting machine. Processor 510 may accomplish these operations according to the processes and techniques discussed above.

The nodes of system 100, including edge nodes 120, data center 110, computer systems 210/500, and virtual machines 220, are representative of any suitable network element that can exchange electronic information (e.g., packet information). This terminology is meant to encompass network appliances, servers, routers, switches, gateways, bridges, loadbalancers, modules, or any other device, component, proprietary element, or object operable to exchange information in a network environment. The network elements can also be representative of any suitable endpoints, which can have various potential applications. The network elements are configured to receive and/or capture data for subsequently propagating network communications. In their configurations, the network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with the network elements of system 100, edge nodes 120, data center 110, computer systems 210/500, and virtual machines 220 can include memory elements for storing information to be used in the operations outlined herein. Each of these elements may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Information being used, tracked, sent, stored, or received by network elements could be provided in any database, register, queue, table, cache, control list, or other storage structure, all of which can be referenced at any suitable timeframe. Any such storage options may be included within the broad term "memory element" or "memory" as used herein.

In certain example implementations, the address resolution suppression functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements can store data used for the operations described herein. This includes the memory elements being able to store software, logic, code, or processor instructions that are executed to carry out the activities described herein.

In one example implementation, edge nodes 120, data center 110, computer systems 210/500, and/or virtual machines 220 may include software modules to achieve, or to foster, the address resolution operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Additionally, each of edge nodes 120, data center 110, computer systems 210/500, and/or virtual machines 220 may include one or more processors (or virtual processors)

that can execute software or an algorithm to perform activities as discussed herein. A processor or virtual processor can execute any type of instructions associated with the data to achieve the operations detailed herein. In one example, a processor (such as shown in FIGS. 3 and 5) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term "processor."

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. Many modifications and variations can readily be implemented without departing from the scope and spirit of the disclosure. The implementations were chosen and described in order to explain the principles of the disclosure and the practical application and to enable others to understand the disclosure for various implementations with various modifications as are suited to the particular use contemplated.

A number of implementations have been described for address resolution suppression over a data center interconnect, and several others have been mentioned or suggested. Moreover, it should be recognized that a variety of additions, deletions, modifications, and substitutions may be made to these implementations while still achieving address resolution suppression over a data center interconnect. Thus, the scope of the protected subject matter should be judged based on the following claims, which may capture one or more aspects of one or more implementations.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method to be performed by an edge node, wherein the edge node communicatively connects a data center to a data center interconnect, the method comprising:
building a cache as address resolution protocol (ARP) messages are received in a network environment, wherein the cache includes information about local machines not located over the data center interconnect and remote machines located over the data center interconnect;
receiving an ARP reply from a local machine associated with the data center;
updating the cache based on the ARP reply from the local machine, wherein a local machine identifier for the local machine is stored in the cache when the local machine has not already been identified in the cache;
sending the ARP reply to a plurality of edge nodes through a data plane of the data center interconnect, wherein each of the plurality of edge nodes communicatively connects a respective data center to the data center interconnect;
receiving an ARP reply from a remote machine in the data plane;
when the ARP reply is associated with an ARP request from one of the local machines associated with the data center, sending the ARP reply to the one of the local machines; and when the ARP reply is not associated with an ARP request from one of the local machines associated with the data center, dropping the ARP reply; and
snooping in the data plane for the ARP messages in a multicast tunnel.

2. The method of claim 1, further comprising:
receiving an ARP request from the local machine; and
determining whether a target machine identified in the ARP request is a local machine associated with the data center.

3. The method of claim 2, further comprising:
updating the cache based on the ARP request from the local machine, wherein a local machine identifier for the local machine is stored in the cache when the local machine has not already been identified in the cache.

4. The method of claim 2, further comprising:
when the cache includes a local machine identifier for the target machine, dropping the ARP request.

5. The method of claim 2, further comprising:
when the target machine is not a local machine, sending the ARP request to the plurality of edge nodes through the data plane of the data center interconnect.

6. The method of claim 2, further comprising:
when the cache does not include a local machine identifier for the target machine, determining whether the cache includes an address binding for the target machine; and
when the cache includes an address binding for the target machine, sending an ARP reply message to the local machine that includes the address binding.

7. The method of claim 6, further comprising:
when the cache does not include an address binding for the target machine, sending the ARP request to the plurality of edge nodes through the data plane of the data center interconnect.

8. The method of claim 1, further comprising:
receiving an ARP request from a remote machine in the data plane;
updating the cache based on the ARP request from the remote machine, wherein the edge node stores an address binding for the remote machine in the cache when the remote machine has not already been identified in the cache; and
sending the ARP request to at least one local machine associated with the data center.

9. The method of claim 1, further comprising:
updating the cache based on the ARP reply from the remote machine, wherein the edge node stores an address binding for the remote machine in the cache when the remote machine has not already been identified in the cache.

10. The method of claim 1, further comprising altering a delivery technique for sending the ARP reply from unicast to a multicast tunnel or a broadcast tunnel.

11. An edge node that communicatively connects a data center with a data center interconnect, the edge node comprising:
  a memory for storing data, wherein the memory includes a cache for storing information about local machines not located over the data center interconnect and remote machines located over the data center interconnect; and
  a processor operable to execute instructions associated with the data, wherein the processor and the memory cooperate such that the edge node is configured for:
    building the cache as address resolution protocol (ARP) messages are received in a network environment;
    receiving an ARP reply from a local machine associated with the data center;
    updating the cache based on the ARP reply from the local machine, wherein a local machine identifier for the local machine is stored in the cache when the local machine has not already been identified in the cache; and
  sending the ARP reply to a plurality of edge nodes through a data plane of the data center interconnect, wherein each of the plurality of edge nodes communicatively connects a respective data center to the data center interconnect;
  receiving an ARP reply from a remote machine in the data plane;
  when the ARP reply is associated with an ARP request from one of the local machines associated with the data center, sending the ARP reply to the one of the local machines; and when the ARP reply is not associated with an ARP request from one of the local machines associated with the data center, dropping the ARP reply; and
  snooping in the data plane for the ARP messages in a multicast tunnel.

12. The edge node of claim 11, further configured for:
  determining whether an ARP request has been received from the local machine;
  updating the cache based on the ARP request from the local machine, wherein a local machine identifier for the local machine is stored in the cache when the local machine has not already been identified in the cache; and
  determining whether a target machine identified in the ARP request is a local machine associated with the data center.

13. The edge node of claim 12, further configured for:
  when the cache includes a local machine identifier for the target machine, dropping the ARP request.

14. The edge node of claim 13, further configured for:
  when the target machine is not a local machine, sending the ARP request to the plurality of edge nodes through the data plane of the data center interconnect.

15. The edge node of claim 12, further configured for:
  when the cache does not include a local machine identifier for the target machine, determining whether the cache includes an address binding for the target machine; and
  when the cache includes an address binding for the target machine, sending an ARP reply message to the local machine that includes the address binding.

16. One or more non-transitory media encoded with logic that includes code for execution, and when executed by one or more processors of an edge node configured to communicatively connect a data center with a data center interconnect, is operable to perform operations comprising:
  building a cache as address resolution protocol (ARP) messages are received in a network environment, wherein the cache includes information about local machines not located over the data center interconnect and remote machines located over the data center interconnect;
  receiving an ARP reply from a local machine associated with the data center;
  updating the cache based on the ARP reply from the local machine, wherein a local machine identifier for the local machine is stored in the cache when the local machine has not already been identified in the cache; and
  sending the ARP reply to a plurality of edge nodes through a data plane of the data center interconnect, wherein each of the plurality of edge nodes communicatively connects a respective data center to the data center interconnect;
  receiving an ARP reply from a remote machine in the data plane;
  when the ARP reply is associated with an ARP request from one of the local machines associated with the data center, sending the ARP reply to the one of the local machines; and when the ARP reply is not associated with an ARP request from one of the local machines associated with the data center, dropping the ARP reply; and
  snooping in the data plane for the ARP messages in a multicast tunnel.

17. The non-transitory media of claim 16, the operations further comprising:
  receiving an ARP request from the local machine; and
  determining whether a target machine identified in the ARP request is a local machine associated with the data center.

18. The non-transitory media of claim 17, the operations further comprising:
  updating the cache based on the ARP request from the local machine, wherein a local machine identifier for the local machine is stored in the cache when the local machine has not already been identified in the cache.

19. The non-transitory media of claim 17, the operations further comprising:
  when the cache includes a local machine identifier for the target machine, dropping the ARP request.

* * * * *